(12) United States Patent
Kitanaka et al.

(10) Patent No.: US 8,816,678 B2
(45) Date of Patent: Aug. 26, 2014

(54) ROTATION SENSOR

(75) Inventors: Tatsuya Kitanaka, Nagoya (JP);
Hajime Yokoyama, Toyota (JP)

(73) Assignee: Denso Corporation, Kariya (JP)

( * ) Notice: Subject to any disclaimer, the term of this patent is extended or adjusted under 35 U.S.C. 154(b) by 268 days.

(21) Appl. No.: 13/439,167

(22) Filed: Apr. 4, 2012

(65) Prior Publication Data

US 2012/0293167 A1 Nov. 22, 2012

(30) Foreign Application Priority Data

May 16, 2011 (JP) ................................. 2011-109297

(51) Int. Cl.
*G01D 5/14* (2006.01)
*G01D 11/24* (2006.01)

(52) U.S. Cl.
CPC .............. *G01D 5/147* (2013.01); *G01D 11/245* (2013.01)
USPC ................................ 324/207.25; 324/207.11

(58) Field of Classification Search
USPC ................. 324/207.25, 244, 227, 204, 207.2, 324/207.21
See application file for complete search history.

(56) References Cited

U.S. PATENT DOCUMENTS

| | | | | |
|---|---|---|---|---|
| 5,637,995 A * | 6/1997 | Izawa et al. | .................... | 324/174 |
| 6,100,682 A * | 8/2000 | Schroeder | ................ | 324/207.21 |
| 6,101,879 A * | 8/2000 | Shirai et al. | ................. | 73/514.39 |
| 7,453,262 B2 * | 11/2008 | Kawasaki et al. | .............. | 324/174 |
| 7,592,803 B1 * | 9/2009 | Guo et al. | ................. | 324/207.25 |
| 2003/0085699 A1 * | 5/2003 | Sakanoue | ................... | 324/207.2 |
| 2006/0119353 A1 * | 6/2006 | Nakano et al. | ........... | 324/207.25 |
| 2008/0128586 A1 * | 6/2008 | Johnson et al. | ............ | 250/203.4 |
| 2009/0058404 A1 * | 3/2009 | Kurumado | ............... | 324/207.25 |
| 2009/0315543 A1 * | 12/2009 | Guo et al. | ................. | 324/207.21 |
| 2010/0225309 A1 * | 9/2010 | Takahashi et al. | ........ | 324/207.25 |
| 2011/0156728 A1 * | 6/2011 | Sato et al. | ...................... | 324/723 |

FOREIGN PATENT DOCUMENTS

| | | |
|---|---|---|
| JP | 8338850 | 12/1996 |
| JP | 2000310646 | 11/2000 |
| JP | 200191525 A | 4/2011 |
| JP | 2001330473 A | 11/2011 |

OTHER PUBLICATIONS

Office Action issued Apr. 16, 2013 in corresponding Japanese Application No. 2011-109297 with English translation.

* cited by examiner

*Primary Examiner* — Arleen M Vazquez
*Assistant Examiner* — Dominic Hawkins (57) ABSTRACT

A magnetism detection elements are arranged in an arrangement direction substantially perpendicular to a tooth trace of a gear when viewed from a magnetism generation unit and send a signal according to a magnetic flux flowing between the gear and the magnetism generation unit. A detection unit detects rotation of the gear according to the signal. A case accommodates the magnetism detection elements. A movement restriction unit is equipped to the case and located on the side of the gear at a place between the magnetism detection elements to restrict a magnetic foreign matter, which adheres to the case, from moving in the arrangement direction of the magnetism detection elements.

6 Claims, 13 Drawing Sheets

ROTATION SENSOR

CROSS REFERENCE TO RELATED APPLICATION

This application is based on Japanese Patent Application No. 2011-109297 filed on May 16, 2011, the disclosure of which is incorporated herein by reference.

TECHNICAL FIELD

The present disclosure relates to a rotation sensor configured to detect rotation of a gear.

BACKGROUND

As disclosed in JP-A-8-338850 and JP-A-2000-310646, for example, known rotation sensors are configured to implement non-contact detection for detecting the revolution and/or the rotative direction of a gear made from a metallic material such as a ferrous material. The rotation sensor disclosed in JP-A-8-338850 includes a case located outside teeth or a gear. In the configuration of JP-A-8-338850, the case accommodates a magnet and a hall IC device including two hall elements. Each hall element sends a voltage signal according to a magnetic flux flowing between the magnet and the gear. The rotation sensor detects the revolution of the gear according to a differential output of two signals sent from the two hall elements.

Figure 12A:
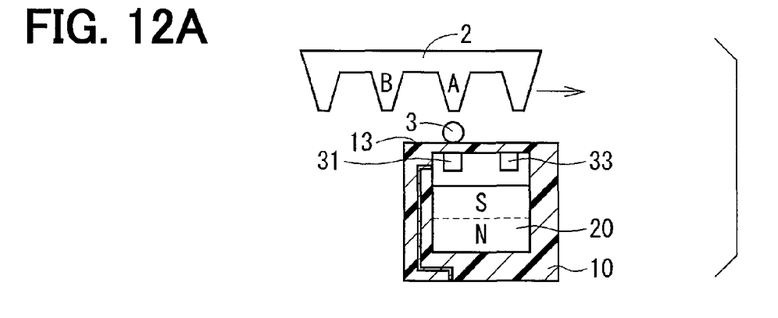
FIG. 12A, FIG. 12B, FIG. 12C, FIG. 12D, are explanatory views showing movement of a contaminating particle adhering to a rotation sensor, according to a comparative example.
Figure 12B:
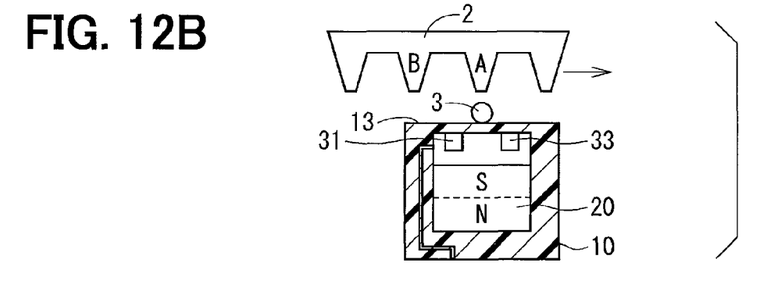
Figure 12C:
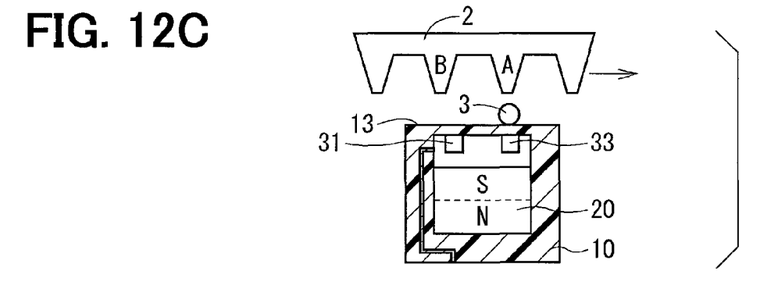
Figure 12D:
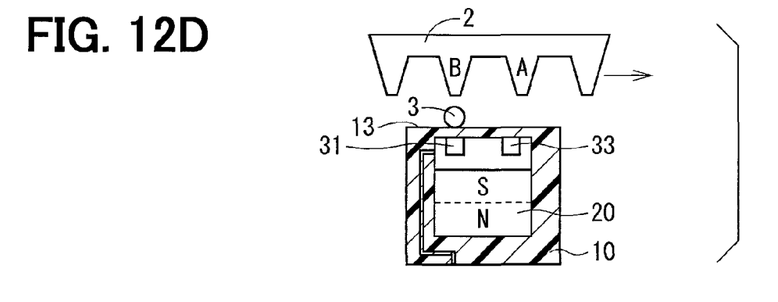

FIGS. 12A to 12D show an operation of a comparative example of a rotation sensor having a configuration similar to those of JP-A-8-338850 and JP-A-2000-310646. In FIG. 12A, a contaminating particle 3 such as a magnetic foreign matter may be magnetically attracted by a magnet 20 to adhere on a case 10 of the rotation sensor. In such a state, the contaminating particle 3 is located in the place where the density of the magnetic flux between a tooth A of a gear 2 and the magnet 20 is strong. As illustrated in FIGS. 12B and 12C in this order, when the gear 2 rotates at a low revolution frequency, such as 100 Hz, the contaminating particle 3 moves on a surface 13 of the case 10 on the side of the gear 2 along with rotation of the gear 2. Subsequently, the tooth B of the gear 2 on the rear side relative to the rotative direction moves toward the contaminating particle 3. Thus, the density of the magnetic flux flowing between the tooth B of the gear 2 and the magnet 20 becomes stronger than the density of the magnetic flux flowing between the tooth A of the gear 2 and the magnet 20 through the contaminating particle 3. Consequently, as illustrated in FIGS. 12C and 12D, the contaminating particle 3 moves on the surface 13 of the case 10 toward the space between the tooth B of the gear 2 on the rear side relative to the rotative direction and the magnet 20. In the present state, the contaminating particle 3 passes through the space among hall elements 31 and 33 and the gear 2 to reduce the apparent space among the hall elements 31 and 33 and the gear 2. Consequently, the apparent magnetic resistance among the hall elements 31 and 33 and the gear 2 decreases. Thus, the hall elements 31 and 33 may send its detection signals at wrong output timings in this way to cause the rotation sensor to detect the revolution of the gear 2 higher than the actual revolution of the gear 2.

Figure 13A:
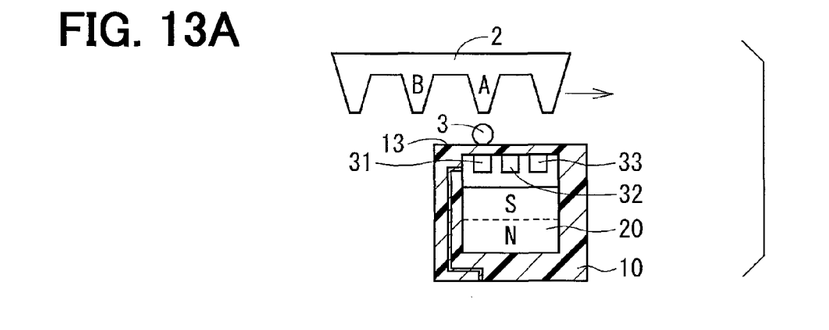
FIG. 13A, FIG. 13B, FIG. 13C, FIG. 13D, are explanatory views showing movement of a contaminating particle adhering to a rotation sensor, according to another comparative example.
Figure 13B:
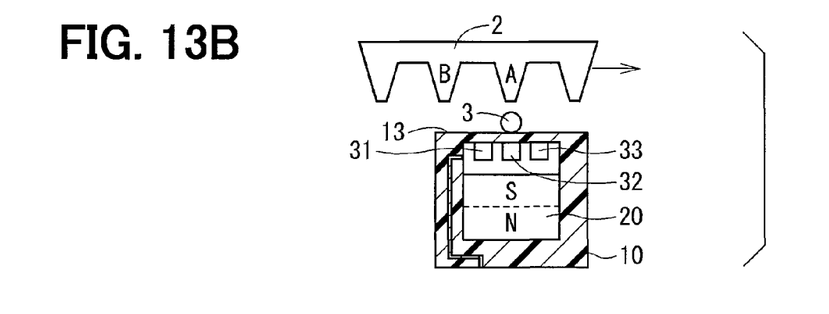
Figure 13C:
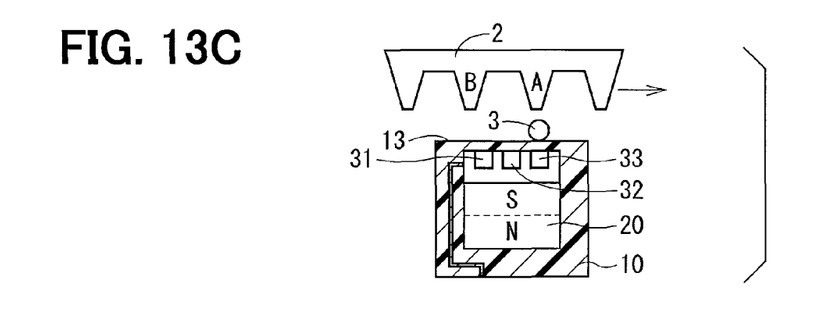
Figure 13D:
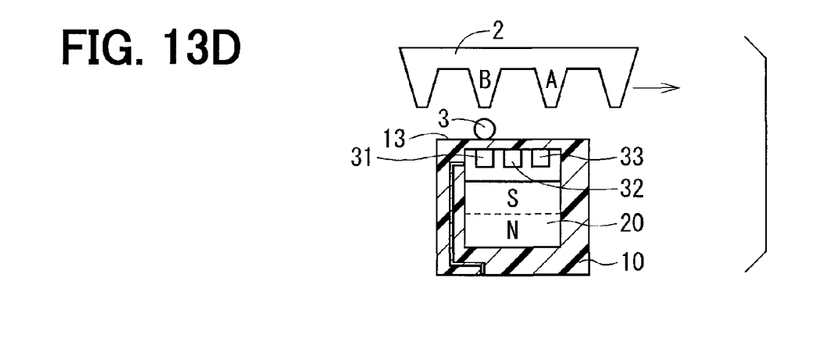

In another exemplified configuration, a rotation sensor shown in FIGS. 13A to 13D includes three hall elements 31, 32, 33. The rotation sensor detects the rotative direction and the revolution of the gear 2 according to the phase difference between a differential output of one group of the hall elements 31 and 32 adjacent to each other and a differential output of the other group of the hall elements 32 and 33 adjacent to each other. As illustrated in FIG. 13C and FIG. 13D, when the contaminating particle 3 passes through the space between the gear 2 and the hall element 32, which is located at the center of the rotation sensor, the hall element 32 may send its detection signal at a wrong output timing. Consequently, the phase difference between the differential output of the one group of the hall elements 31 and 32 and the differential output of the other group of the hall elements 32 and 33 may vary in this way. As a result, the rotation sensor may detect a wrong rotative direction of the gear 2 opposite to the actual rotative direction of the gear 2.

SUMMARY

It is an object of the present disclosure to provide a rotation sensor configured to enhance its detection accuracy.

According to an aspect of the disclosure, a rotation sensor is configured to detect rotation of a gear formed from a metallic material. The rotation sensor comprises a magnetism generation unit equipped to one side in a direction in which a tooth projects from its root of the gear. The rotation sensor further comprises a plurality of magnetism detection elements arranged in a direction substantially perpendicular to a tooth trace of the gear when being viewed from the magnetism generation unit and configured to send a signal according to a magnetic flux flowing between the gear and the magnetism generation unit. The rotation sensor further comprises a detection unit configured to detect rotation of the gear according to the signal of the plurality of magnetism detection elements. The rotation sensor further comprises a case accommodating the plurality of magnetism detection elements. The rotation sensor further comprises a movement restriction unit equipped to the case and located on a side of the gear at a place between one of the plurality of magnetism detection elements and an other of the plurality of magnetism detection elements, the movement restriction unit being configured to restrict a magnetic foreign matter, which adheres to the case, from moving in a direction in which the plurality of magnetism detection elements are arranged.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As follows, multiple embodiments of the present invention will be described with reference to drawings.

First Embodiment

Figure 1:
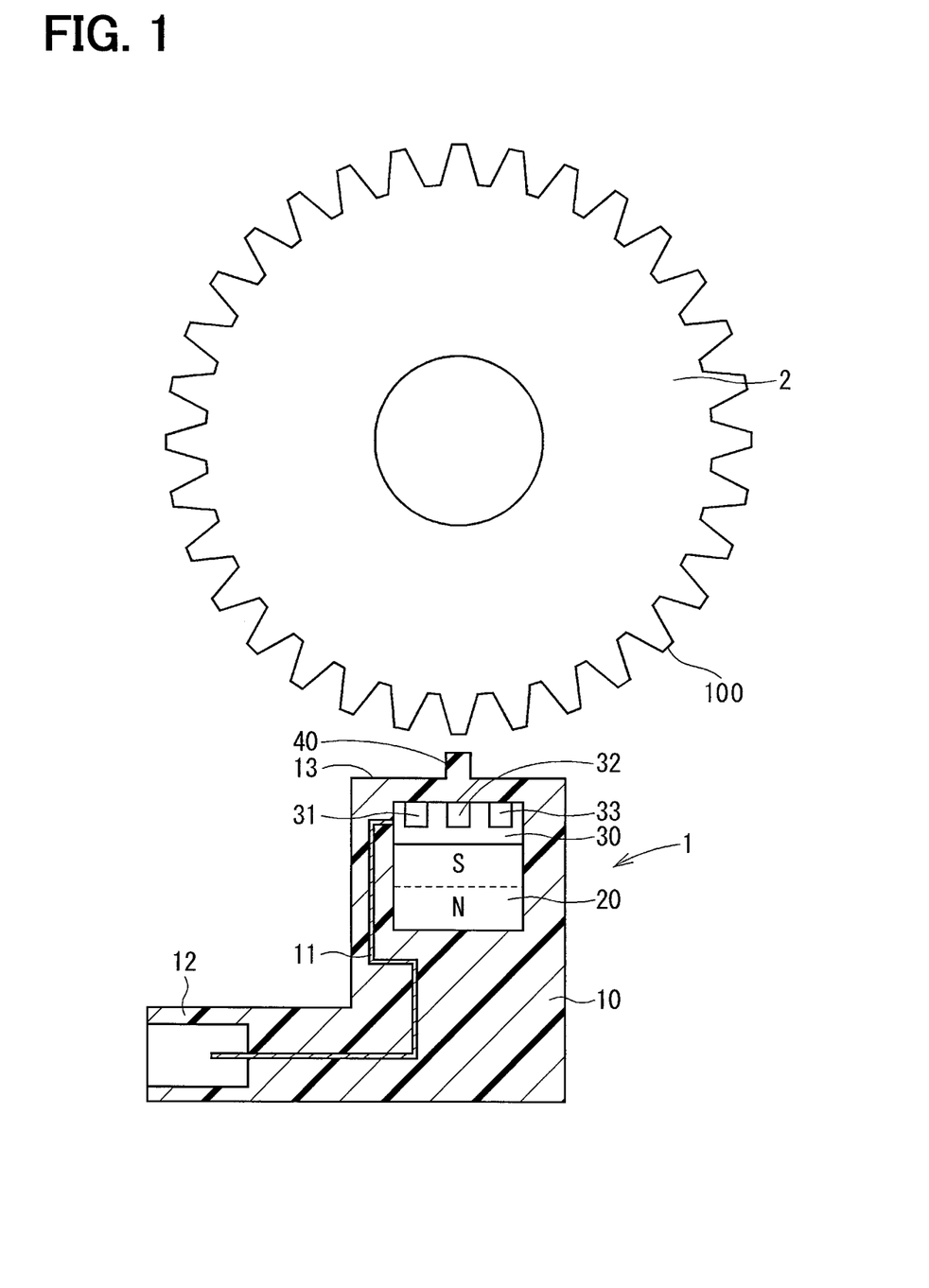
FIG. 1 is a sectional view showing a rotation sensor according to the first embodiment.
Figure 6:
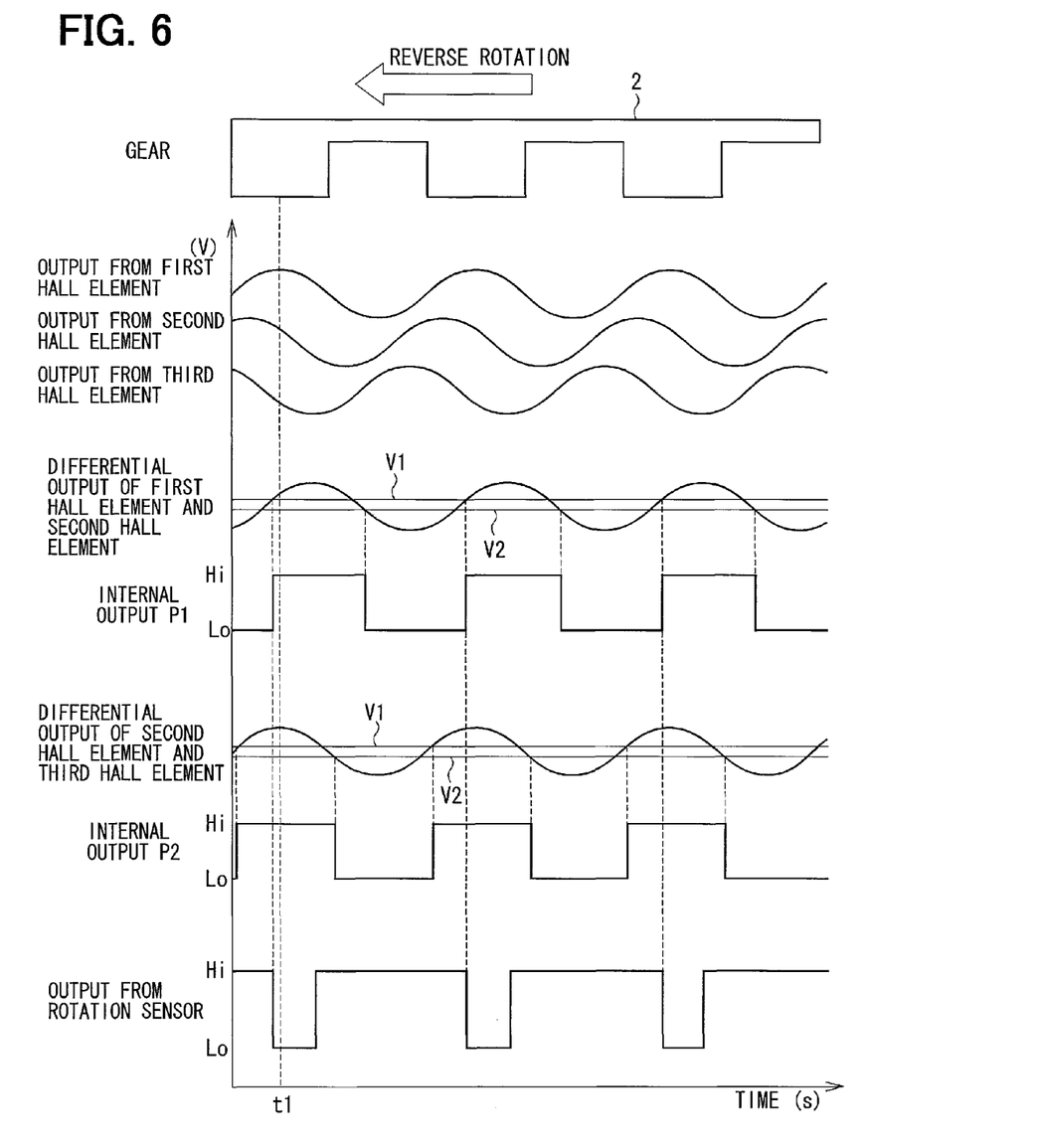
FIG. 6 is a graph showing an output characteristic of the rotation sensor, when the gear rotates reversely, according to the first embodiment.

FIG. 1 and FIG. 6 show a rotation sensor 1 according to the first embodiment. The rotation sensor 1 detects the revolution and the rotative direction of a gear 2 in the state where the rotation sensor 1 is non-contact with the gear 2. The gear 2 is formed of a magnetic material, such as a ferrous material. The rotation sensor 1 is configured to detect the revolution and/or the rotative direction of various gears, such as a spur gear, a helical gear, a double helical gear, a bevel gear, an a crown gear, a hypoid gear, or a worm gear. The rotation sensor 1 is also configured to detect the movement and/or the moving direction of various actuators, such as a rack.

The rotation sensor 1 includes a case 10, a magnet 20 as a magnetism generation unit, an integrated circuit 30 as a detection unit, hall elements 31, 32, 33 as a magnetism detection element, a projected portion 40 as a movement restriction unit, and/or the like.

Figure 2:
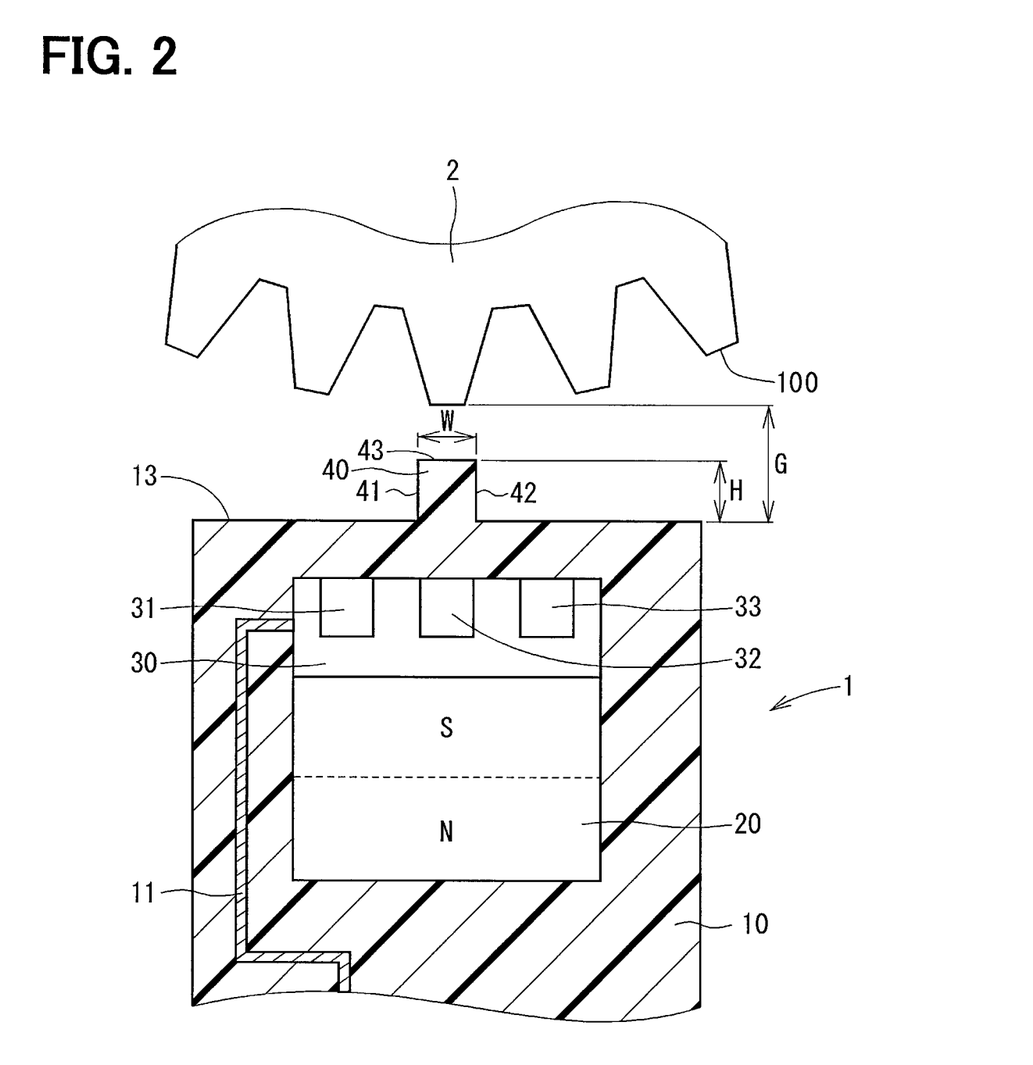
FIG. 2 is an enlarged sectional view showing the rotation sensor according to the first embodiment.
Figure 3:
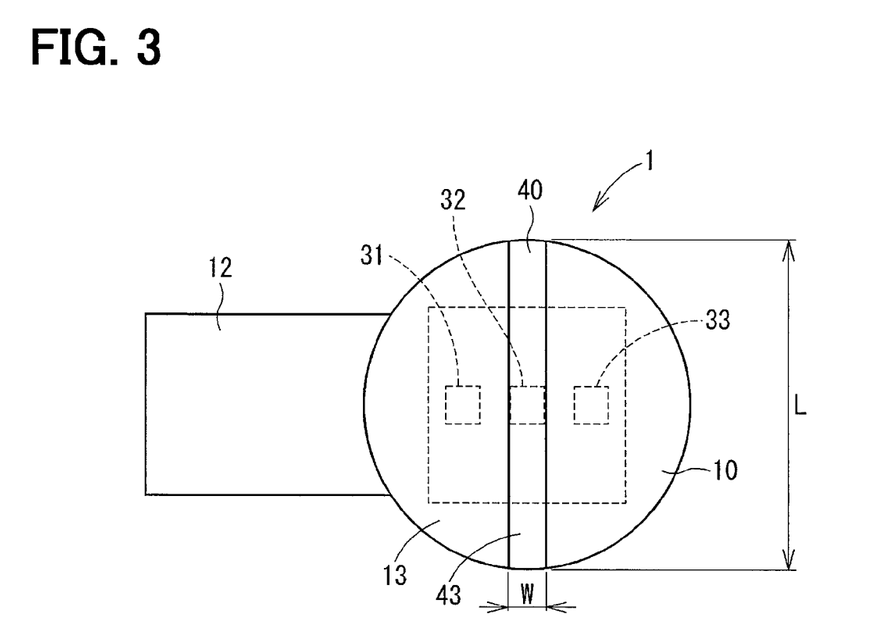
FIG. 3 is a top view showing the rotation sensor according to the first embodiment.

As shown in FIG. 1 to FIG. 3, the case 10 is molded from resin substantially into a cylindrical shape. The case 10 is formed with the magnet 20, the hall elements 31, 32, 33, the integrated circuit 30, a terminal 11, and the like. The gear 2 has teeth each projected from its root and configured to be directed toward the case 10. The case 10 is equipped with a connector 12 at one side in the radial direction. The magnet 20 has magnetic poles located on both sides and opposite in the direction in which corresponding one of the teeth is projected from the root of the gear 2 toward the case 10. The magnet 20 generates a magnetic field to cause a magnetic flux flowing through the gear 2.

The hall elements 31, 32, 33 includes the first hall element 31, the second hall element 32, and the third hall element 33 arranged in this order along the radial direction of the case 10. The three hall elements 31, 32, 33 are arranged substantially in line perpendicularly to the tooth trace 100 of the gear 2. Each of the hall elements 31, 32, 33 sends a voltage signal according to the density of the magnetic flux flowing between the gear 2 and the magnet 20. The integrated circuit 30 detects the revolution and the rotative direction of the gear 2 according to the voltage signals sent from the hall elements 31, 32, 33. The integrated circuit 30 sends a sensor signal through the terminal 11 of the connector 12.

The projected portion 40 is integrally molded from resin integrally with the case 10. The projected portion 40 is located on the surface of the case 10 on the side of the gear 2 and is located close to the second hall element 32. The projected portion 40 is extended substantially perpendicular to the direction in which the three hall elements 31, 32, 33 are arranged in line. The projected portion 40 is extended in the direction substantially in parallel with the tooth trace 100 of the gear 2. The projected portion 40 has the cross section substantially in a rectangular shape. The projected portion 40 has two lateral sides 41 and 42 each being raised from a surface 13 of the case 10 on the side of the gear 2. Each of the two lateral sides 41 and 42 are substantially perpendicular to the surface 13 of the case 10. The projected portion 40 has an upper surface 43 connecting the two lateral sides 41 and 42 therebetween. The upper surface 43 is located on the side of the gear 2 and is substantially in parallel with the surface 13 of the case 10. It is conceived that a contaminating particle, such as a magnetic foreign matter, may be magnetically attracted by the magnet 20. Consequently, the attracted contaminating particle may adhere to the surface 13 of the case 10 and may move on the surface 13 along with rotation of the gear 2. In such a situation, the projected portion 40 restricts the contaminating particle from climbing over the projected portion 40.

The projected portion 40 has the height H in the direction in which the projected portion 40 is extended toward the gear 2. The height H of the projected portion 40 is determined to be smaller than a gap G between the corresponding tooth of the gear 2 and the case 10 opposed to each other, such that the projected portion 40 is enabled to restrict movement of such a contaminating particle. In the present embodiment, the height H of the projected portion 40 is determined in a range from 0.5 mm to 1.0 mm to enable the projected portion 40 to restrict movement of a contaminating particle being 1.5 mm or less in diameter. It is conceivable to employ a configuration in which the gap G between the corresponding one tooth of the gear 2 and the case 10 is 1.5 mm. In such a configuration, the teeth of the gear 2 may be enabled to remove a contaminating particle in diameter larger than 1.5 mm from the surface 13 of the case 10.

The projected portion 40 has the width W along the direction in which the three hall elements 31, 32, 33 are arranged in line. The width W of the projected portion 40 is larger than the width of the second hall element 32 and is smaller than the length of the space between the first hall element 31 and the third hall element 33. The projected portion 40 has the length L along the direction of the tooth trace 100 of the gear 2. The length L of the projected portion 40 is substantially the same as the diameter of the case 10 defined by the surface 13. The length L of the projected portion 40 along the tooth trace 100 of the gear 2 may be larger than the length of the hall element 32.

Figure 4A:
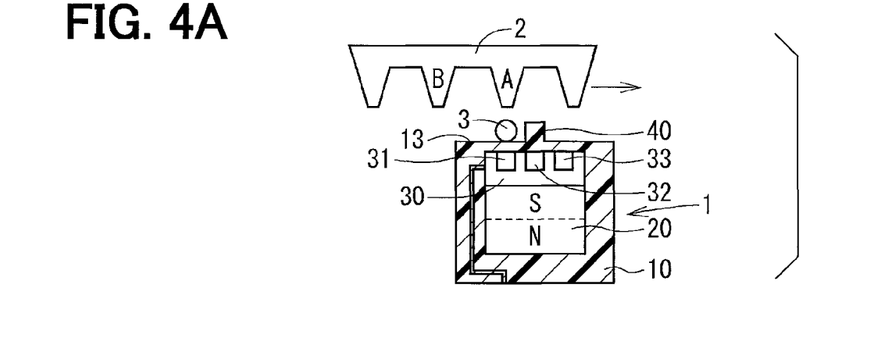
FIG. 4A, FIG. 4B, FIG. 4C, FIG. 4D, are explanatory views showing movement of a contaminating particle adhering to the rotation sensor, according to the first embodiment.
Figure 4B:
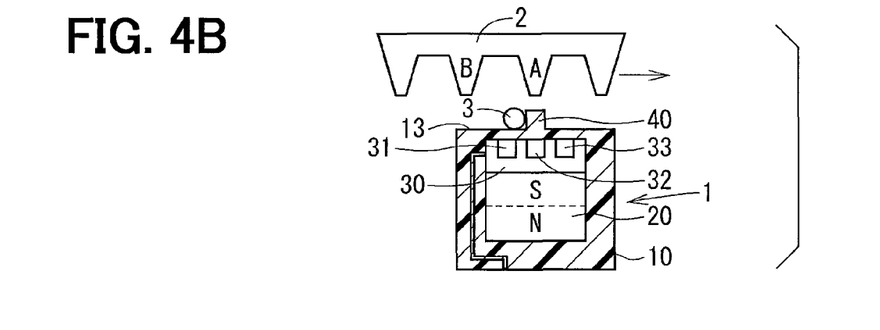
Figure 4C:
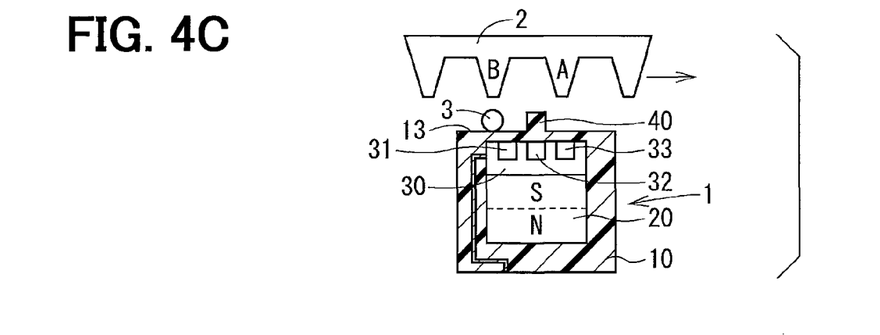
Figure 4D:
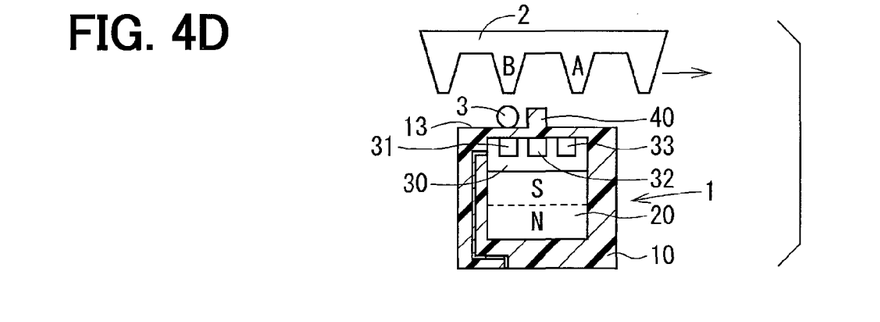

FIGS. 4A to 4D show a contaminating particle, which is magnetically attracted by the magnet 20 to adhere to the case 10 and is moved with rotation of the gear 2. As shown in FIG. 4A, a contaminating particle 3 is located in the place where the density of the magnetic flux between the tooth A of the gear 2 and the magnet 20 is strong. The gear 2 rotates rightward in FIG. 4A. Accordingly, the contaminating particle 3 moves on the surface 13 of the case 10 with rotation of the gear 2. As shown in FIG. 4B, when the tooth A of the gear 2 passes above the projected portion 40, the contaminating particle 3 makes contact with the projected portion 40. In this way, the projected portion 40 restricts further movement of the contaminating particle 3. Subsequently, the tooth B of the gear 2 on the rear side relative to the rotative direction moves toward the projected portion 40. Thus, the density of the magnetic flux flowing among the tooth B of the gear 2, the contaminating particle 3, and the magnet 20 becomes stronger than the density of the magnetic flux flowing among the tooth A of the gear 2, the contaminating particle 3, and the magnet 20. Consequently, as shown in FIG. 4C, the contaminating particle 3 moves on the surface 13 of the case 10 toward the space between the tooth B of the gear 2 on the rear side relative to the rotative direction and the magnet 20. As a result, as shown in FIG. 4D, the contaminating particle 3 moves on the surface 13 of the case 10 accompanied with the rotation of the tooth B of the gear 2 until the contaminating particle 3 makes contact with the projected portion 40.

Figure 5:
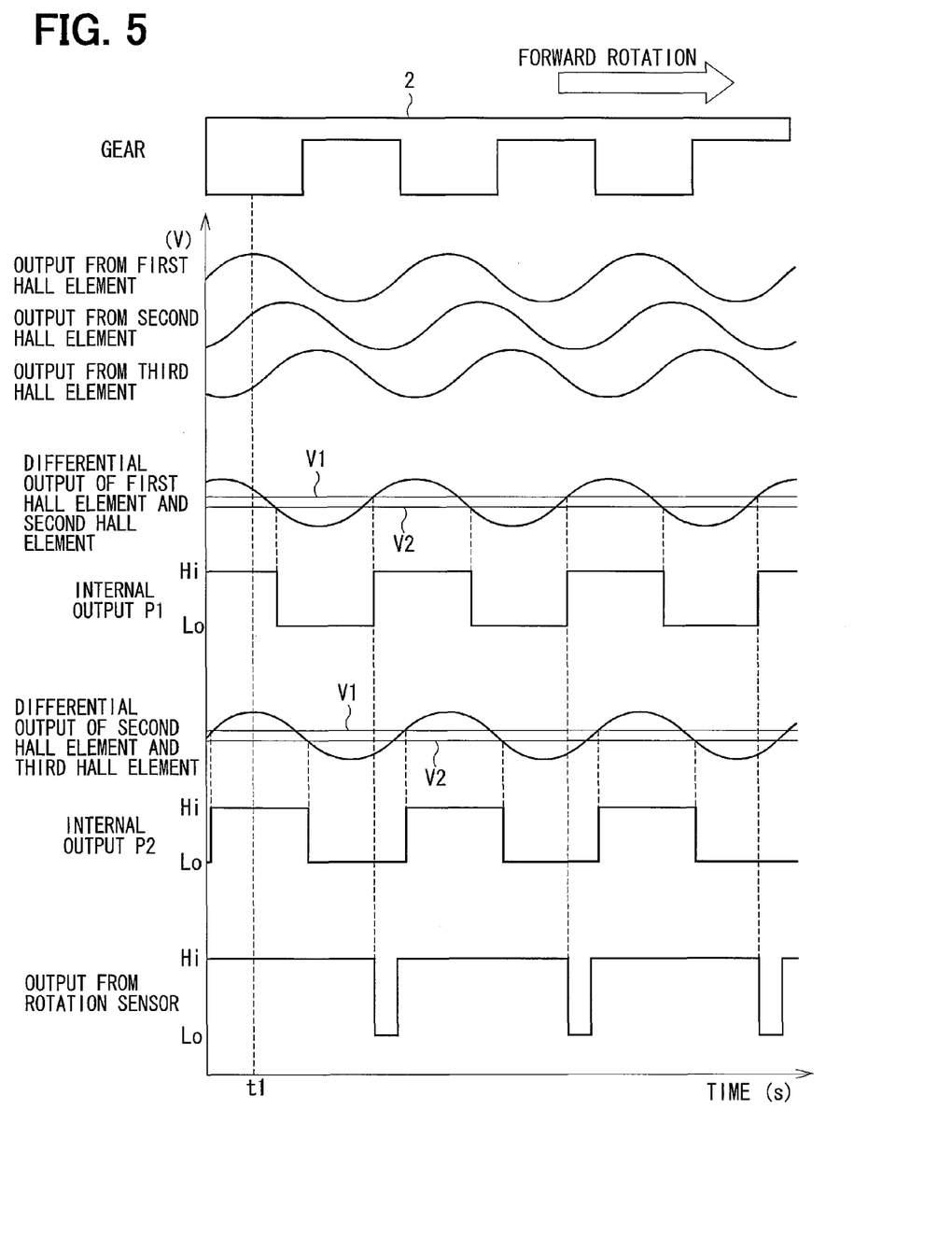
FIG. 5 is a graph showing an output characteristic of the rotation sensor, when a gear rotates forwardly, according to the first embodiment.

As follows, with reference to FIGS. 5 and 6, a method for causing the integrated circuit 30 to detect the revolution and the rotative direction of the gear 2 according to the voltage signals sent from the hall elements 31, 32, 33 will be described. In FIG. 5, the schematic view of the gear 2 represents the position of the tooth at the time t1. At this time, the tooth of the gear 2 is located on the first hall element 31. The gear 2 rotates to move rightward in FIG. 5. The present rotative direction of the gear 2 is set as forward rotation. It is supposed that the contaminating particle 3 exists between the first hall element 31 and the gear 2.

The voltage signals respectively sent from the hall elements 31, 32, 33 are sine waves, which are different in phase. The voltage signal sent from each of the hall elements 31, 32, 33 is corrected by an auto gain controller (AGC), which is contained in the integrated circuit 30, and an auto offset adjuster (AOA). The present configuration reduces influence caused by the contaminating particle 3 and subjected to the sine wave sent from the first hall element 31.

The integrated circuit 30 detects the differential output of the first and second hall elements 31 and 32 adjacent to each other and the differential output of the second and third hall elements 32 and 33 adjacent to each other. The present configuration enables to correct a variation in the output signal of each of the hall elements 31, 32, 33 caused by dimensional tolerance of the gap between the gear 2 and corresponding one of the hall elements 31, 32, 33. The integrated circuit 30 implements comparison between the sine wave of each differential output with two thresholds V1 and V2 thereby to convert the sine wave into pulse signals. Thus, the integrated circuit 30 obtains an internal output P1 and an internal output P2. The integrated circuit 30 further compares the two internal outputs P1 and P2 with each other. According to the comparison result, the integrated circuit 30 determines the rotative direction of the gear 2. Specifically, the integrated circuit 30 determines that the gear 2 rotates forwardly when the time point, at which the pulse signal of the internal output P1 changes from its low level to its high level, is earlier than the time point, at which the pulse signal of the internal output P2 changes from its low level to its high level. In this case, the integrated circuit 30 sends pulse signals representing that the gear 2 rotates forwardly according to the revolution of the gear 2. In the present embodiment, the pulse signal representing forward rotation of the gear 2 is at its low level in a time period shorter a time period in which the pulse signal representing reverse rotation of the gear 2 is at its low level.

In FIG. 6, the gear 2 rotates to move leftward in the drawing. The present rotative direction of the gear 2 is set as reverse rotation. It is supposed that the contaminating particle 3 exists between the first hall element 31 and the gear 2. The voltage signal sent from each of the hall elements 31, 32, 33 is corrected by the AGC and the AOA. Therefore, influence caused by the contaminating particle 3 on the sine wave sent from the first hall element 31 can be reduced.

The integrated circuit 30 detects the differential output of the first and second hall elements 31 and 32 adjacent to each other and the differential output of the second and third hall elements 32 and 33 adjacent to each other. The integrated circuit 30 implements comparison between the sine wave of each differential output with the two thresholds V1 and V2 thereby to convert the sine wave into the pulse signals. Thus, the integrated circuit 30 obtains the internal output P1 and the internal output P2. The integrated circuit 30 further compares the two internal outputs P1 and P2 with each other. According to the comparison result, the integrated circuit 30 determines the rotative direction of the gear 2. Specifically, the integrated circuit 30 determines that the gear 2 rotates reversely when the time point, at which the pulse signal of the internal output P2 changes from its low level to its high level, is earlier than the time point, at which the pulse signal of the internal output P1 changes from its low level to its high level. In this case, the integrated circuit 30 sends pulse signals representing that the gear 2 rotates reversely according to the revolution of the gear 2.

The present embodiment produces the following operation effects. In the present embodiment, the projected portion 40 is equipped to the second hall element 32 on the side of the gear 2. The present configuration restricts the contaminating particle 3 from moving beyond the second hall element 32 between the first hall element 31 and the third hall element 33. Therefore, the second hall element 32 is enabled to send the voltage signal at an appropriate timing accurately with rotation of the gear 2, without sending a signal caused by movement of the contaminating particle 3. Therefore, the rotation sensor 1 is enabled to detect the revolution and the rotative direction of the gear 2 correctly.

In addition, according to the present embodiment, the width W of the projected portion 40 is larger than the width of the second hall element 32 and is smaller than the distance between the first hall element 31 and the third hall element 33. The present configuration regulates movement of the contaminating particle 3 within the region on the upper side of the first hall element 31 or the third hall element 33. Accordingly, it is possible to reduce influence of movement of the contaminating particle 3 to the differential output of two adjacent hall elements. Consequently, the rotation sensor 1 is enabled to detect the revolution and the rotative direction of the gear 2 accurately.

Second Embodiment

FIG. 7 to FIG. 11 show a rotation sensor according to the second embodiment. In the present embodiment, an element substantially the same as that of the above-described first embodiment is denoted by the same reference numeral and description of the element will be omitted.

Figure 7:
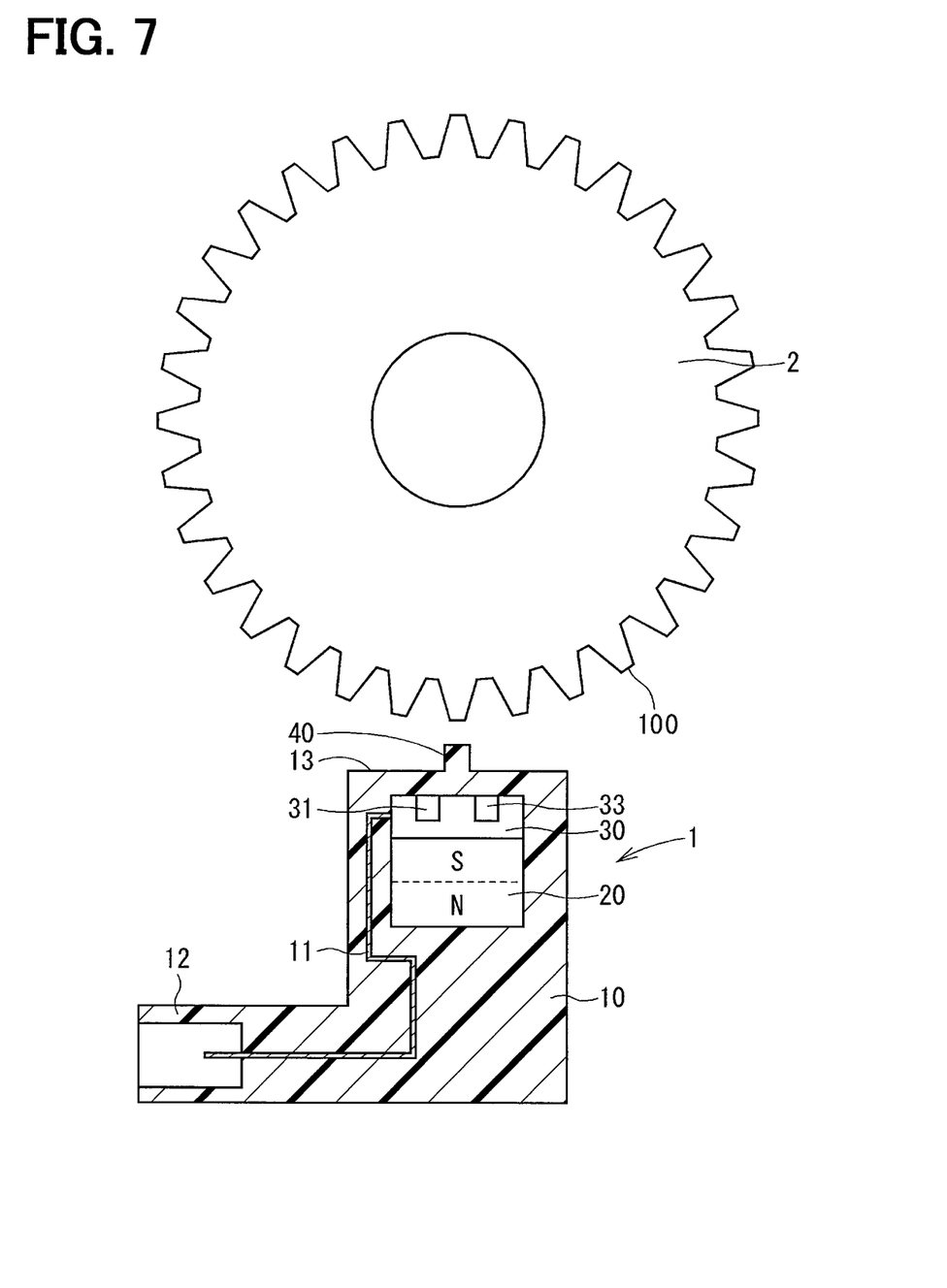
FIG. 7 is a sectional view showing a rotation sensor according to the second embodiment.
Figure 8:
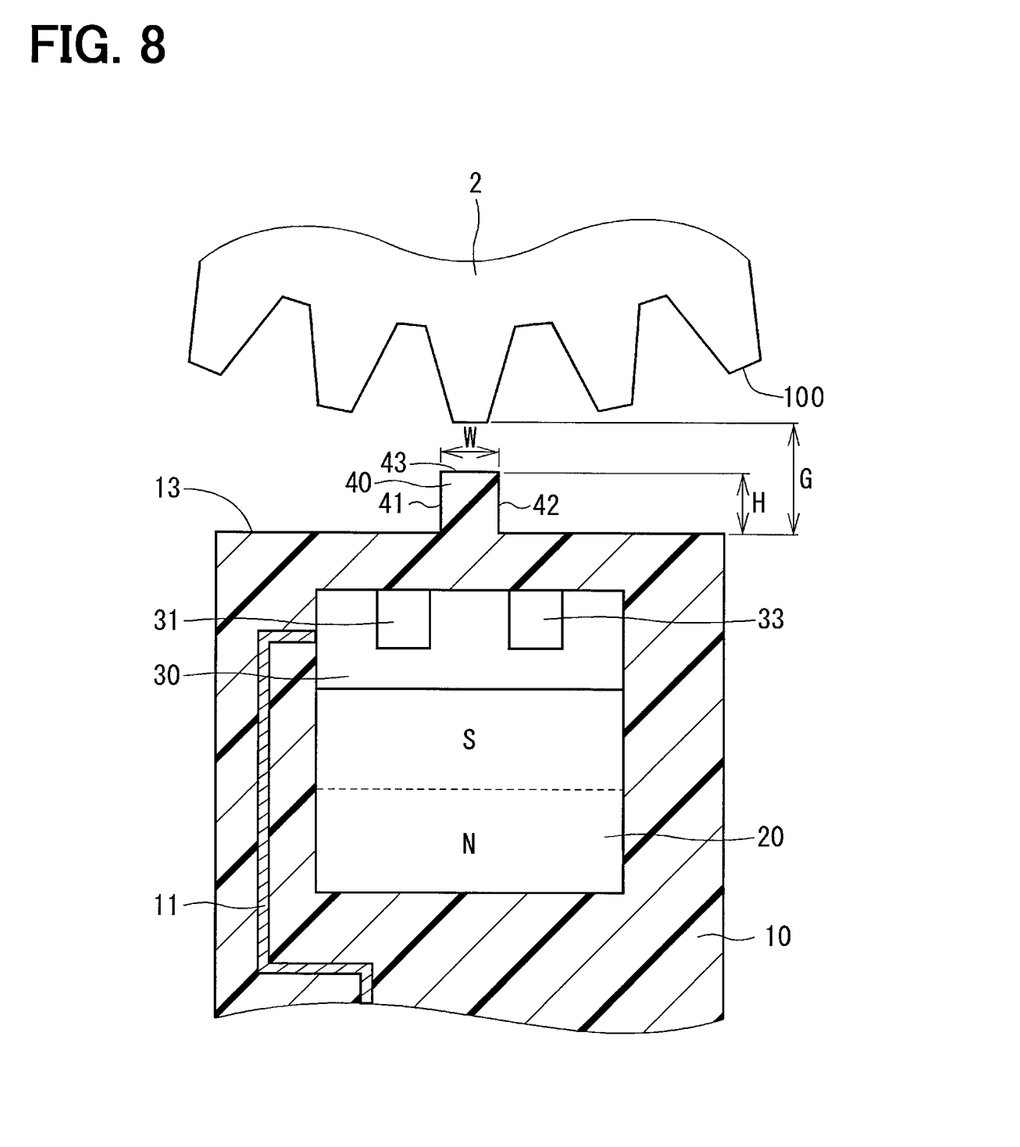
FIG. 8 is an enlarged sectional view showing the rotation sensor according to the second embodiment.
Figure 9:
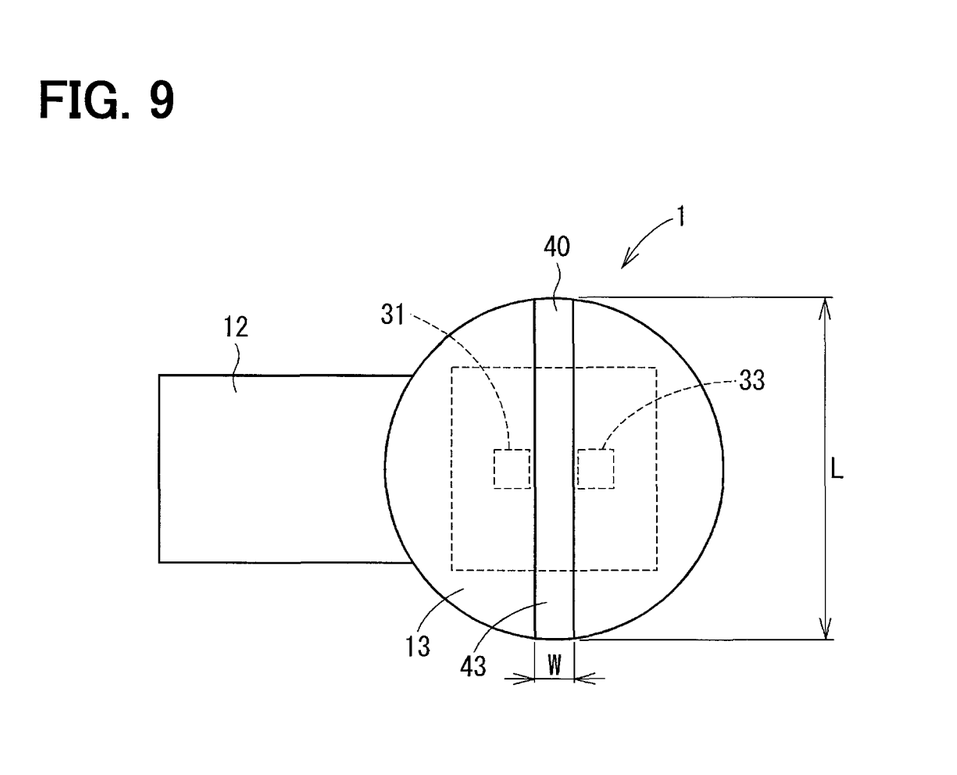
FIG. 9 is a top view showing the rotation sensor according to the second embodiment.
Figure 10A:
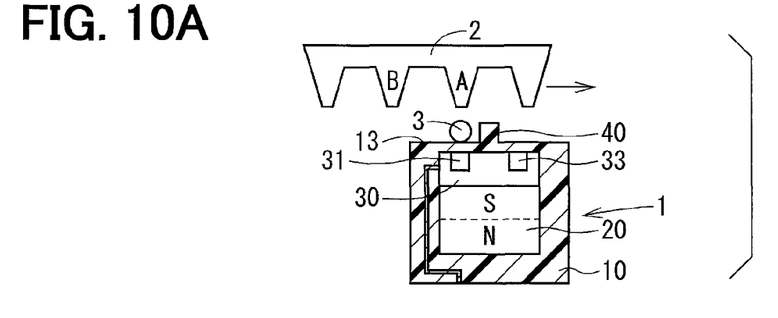
FIG. 10A, FIG. 10B, FIG. 10C, FIG. 10D, are explanatory views showing movement of a contaminating particle adhering to the rotation sensor, according to the second embodiment.
Figure 10B:
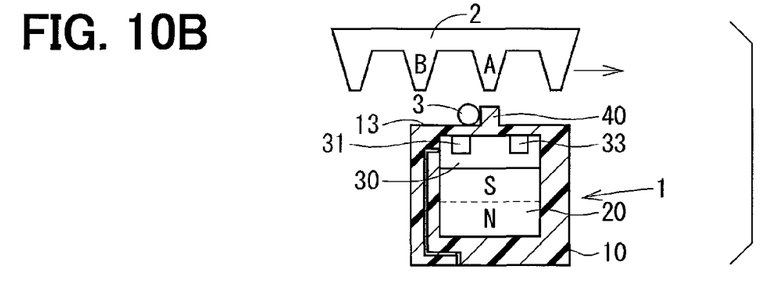
Figure 10C:
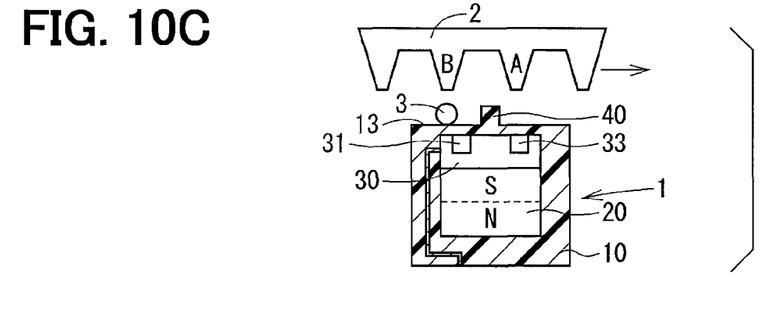
Figure 10D:
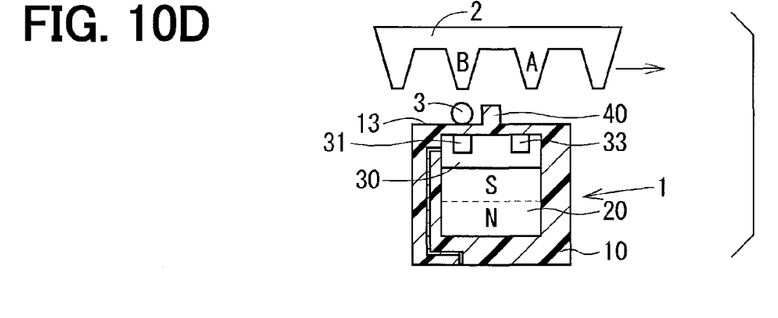

In the present second embodiment, the rotation sensor 1 includes the first hall element 31 and the third hall element 33. The two hall elements 31 and 33 are arranged substantially in line perpendicularly to the tooth trace 100 of the gear 2. The projected portion 40 is located on the surface of the case 10 between the first hall element 31 and the third hall element 33. The projected portion 40 is extended substantially perpendicular to the direction in which the two hall elements 31 and 33 are arranged in line. The projected portion 40 is extended in the direction substantially in parallel with the tooth trace 100 of the gear 2. The width of the projected portion 40 is smaller than the distance between the first hall element 31 and the third hall element 33.

FIGS. 10A to 10D show the contaminating particle 3 adhering to the case 10 and moving with rotation of the gear 2. The movement of the contaminating particle 3 in the present state is substantially the same as that of the above-described first embodiment, and therefore, description of the movement is omitted.

Figure 11:
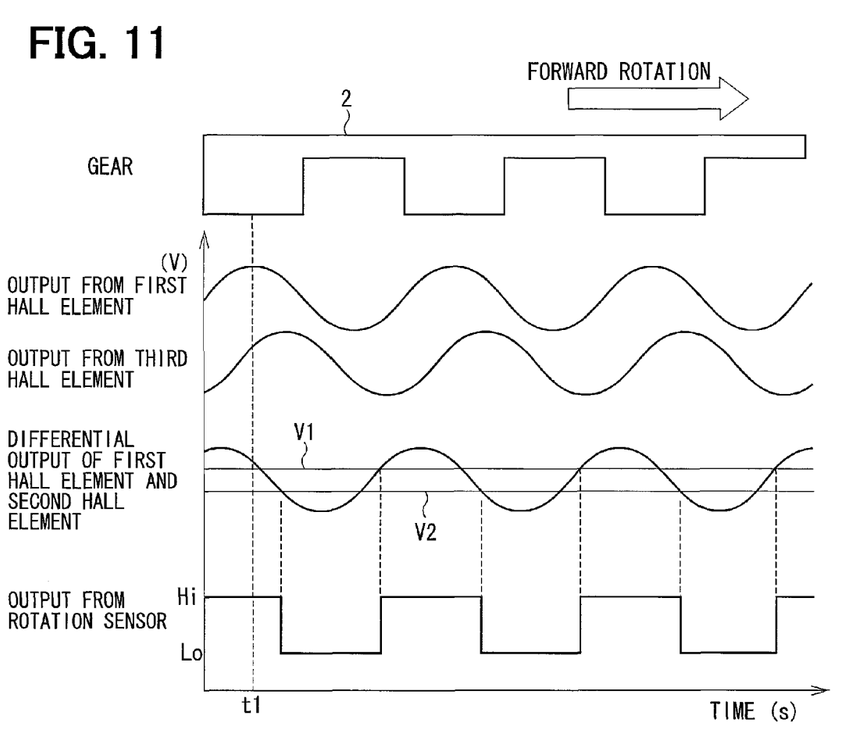
FIG. 11 is a graph showing an output characteristic of the rotation sensor, when a gear rotates forwardly, according to the second embodiment.

As follows, with reference to FIG. 11, a method for causing the integrated circuit 30 to detect the revolution of the gear 2 according to the voltage signals sent from the hall elements 31 and 33 will be described. In FIG. 11, the schematic view of the gear 2 represents the position of the teeth at the time t1. At this time, the tooth of the gear 2 is located on the first hall element 31. The gear 2 rotates forwardly to move rightward in FIG. 11. It is supposed that the contaminating particle 3 exists between the first hall element 31 and the gear 2. The voltage signal sent from each of the hall elements 31 and 33 is corrected by the AGC and the AOA. Therefore, influence caused by the contaminating particle 3 on the sine wave sent from the first hall element 31 can be reduced. The integrated circuit 30 detects the differential output of the adjacent first and third hall elements 31 and 33. The integrated circuit 30 further implements comparison between the sine wave of the differential output with the two thresholds V1 and V2 thereby to convert the sine wave into the pulse signals. In this way, the rotation sensor 1 sends the pulse signals according to the revolution of the gear 2.

In the present embodiment, the projected portion 40 is equipped between the first hall element 31 and the third hall element 33. The present configuration restricts the contaminating particle 3 from moving between the first hall elements 31 and the third hall elements 33. Therefore, the hall elements 31, 33 are enabled to send the voltage signal at appropriate timings accurately with rotation of the gear 2, without sending a signal caused by movement of the contaminating particle 3. Therefore, the rotation sensor 1 is enabled to detect the revolution of the gear 2 correctly.

Other Embodiment

In the above-described embodiments, the case and the projected portion are integrally molded. It is noted that, the case and the projected portion may be formed as separated elements and may be combined together by adhesion or fitting.

In the above-described embodiments, the projected portion is molded from resin being a nonmagnetic material. It is noted that, the projected portion may be formed of a magnetic material such as metal.

In the above-described embodiments, the case is equipped with the projected portion being one element. It is noted that, the projected portion may include multiple projected elements. The projected portion is not limited to be in the straight linear shape, as described above, and may be in a waveform shape when being viewed from the gear 2. The cross section of the projected portion is not limited to the rectangular shape, as described above, and may be in another shape such as a triangular shape or a round shape.

In the above-described embodiments, the projected portion is projected from the surface of the case to function as the movement restriction unit. It is noted that, a groove may be formed as the movement restriction unit on the surface of the case. Specifically, the groove may be dented from the surface of the case toward the magnet and extended substantially in parallel with the tooth trace of the gear.

In the above-described embodiments, all the hall elements are molded in the case. It is noted that, a part of the hall element(s) may be molded in the case.

In the above-described embodiments, the south pole (S pole) of the magnet is located on the side of the gear, and the north pole (N pole) of the magnet is located on the opposite side from the gear. It is noted that, the north pole (N pole) of the magnet may be located on the side of the gear, and the south pole (S pole) of the magnet may be located on the opposite side from the gear.

In the above-described embodiments, the permanent magnet is employed as the magnetism generation unit. It is noted that, another magnetism generator device, such as an electromagnet, may be employed as the magnetism generation unit.

In the above-described embodiments, the hall element is employed as the magnetism detection element. It is noted that, another magnetism detection device, such as a magnetoresistive element (MRE), may be employed as the magnetism detection element.

In the above-described embodiments, the integrated circuit is accommodated as the detection unit in the case. It is noted that, another device such as an electronit control unit (ECU) connected to the terminal of the connector may be employed as the detection unit.

According to the present disclosure, the rotation sensor is configured to detect rotation of the gear, which is formed from a metallic material. The rotation sensor includes the magnetism generation unit, the multiple magnetism detection elements, the detection unit, the case, and the movement restriction unit. The magnetism generation unit is equipped to one side in a direction in which a tooth projects from a root of the gear. The multiple magnetism detection elements are arranged in the direction substantially perpendicular to the tooth trace of the gear when being viewed from the side of the magnetism generation unit and configured to send the signal according to the magnetic flux flowing between the gear and the magnetism generation unit. The detection unit is configured to detect rotation of the gear according to the signal of the multiple magnetism detection elements. The case accommodates the multiple magnetism detection elements. The movement restriction unit equipped to the case on the side of the gear and located between the magnetism detection elements is configured to restrict a magnetic foreign matter adhering to the case from moving in the direction in which the magnetism detection elements are arranged in line.

With the present configuration, the magnetism detection elements are enabled to send the signal at a correct timing with rotation of the gear, without sending a signal caused by movement of the magnetic foreign matter. Accordingly, the detection unit is enabled to detect the revolution and/or the rotative direction of the gear correctly. Consequently, detection accuracy of the rotation sensor can be enhanced.

The movement restriction unit may be the projected portion projected from the case toward the gear and extended substantially in parallel with the tooth trace. The present configuration enables to restrict movement of a magnetic foreign matter from moving in the direction, in which the multiple magnetism detection elements are arranged in line, when the magnetic foreign matter makes contact with the projected portion.

The case and the movement restriction unit may be integrally formed from a nonmagnetic material. The present configuration enables to reduce manufacturing cost of the rotation sensor.

The magnetism detection element may include the first magnetism detection element, the second magnetism detection element, and the third magnetism detection element, which are arranged in this order in the direction substantially perpendicular to the tooth trace of the gear. In this case, the movement restriction unit may be equipped to the place on the side of the gear relative to the second magnetism detection element. The present configuration restricts a magnetic foreign matter from moving between the first magnetism detection element and the third magnetism detection element beyond the second magnetism detection element. Consequently, accuracy of the rotation sensor when detecting the rotative direction of the gear can be enhanced.

The width of the movement restriction unit in the direction, in which the multiple magnetism detection elements are arranged in line, may be greater than the width of the second magnetism detection element and may be smaller than the width between the first magnetism detection element and the third magnetism detection element. The present configuration restricts a magnetic foreign matter from moving between the first magnetism detection element and the second magnetism detection element and restricts a magnetic foreign matter from moving between the second magnetism detection element and the third magnetism detection element.

The magnetism detection elements may include the first magnetism detection element and the third magnetism detection element, which are arranged in this order in the direction substantially perpendicular to the tooth trace of the gear. In this case, the movement restriction unit may be equipped to a place between the first magnetism detection element and the third magnetism detection element and on the side of the gear. The present configuration restricts a magnetic foreign matter from moving between the first magnetism detection element and the third magnetism detection element. Consequently, accuracy of the rotation sensor when detecting the revolution of the gear can be enhanced.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A rotation sensor configured to detect rotation of a gear formed from a metallic material, the rotation sensor comprising:
    a magnetism generation unit equipped to one side in a direction in which a tooth projects from its root of the gear;
    a plurality of magnetism detection elements arranged in a direction perpendicular to a tooth trace of the gear when being viewed from the magnetism generation unit and configured to send a signal according to a magnetic flux flowing between the gear and the magnetism generation unit;
    a detection unit configured to detect rotation of the gear according to the signal of the plurality of magnetism detection elements;
    a case accommodating the plurality of magnetism detection elements; and
    a movement restriction unit equipped to the case and located on a side of the gear at a place between one of the plurality of magnetism detection elements and an other of the plurality of magnetism detection elements, the movement restriction unit being configured to restrict a magnetic foreign matter, which adheres to the case, from moving in a direction in which the plurality of magnetism detection elements are arranged, wherein
    the movement restriction unit is a projected portion projected from the case toward the gear and extended in parallel with the tooth trace of the gear,
    the case and the movement restriction unit are integrally formed from a nonmagnetic material,
    the plurality of magnetism detection elements include a first magnetism detection element, a second magnetism detection element, and a third magnetism detection element, which are arranged in this order in a direction perpendicular to the tooth trace of the gear,
    the movement restriction unit is located on a side of the gear relative to the second magnetism detection element,
    the movement restriction unit has a width in the direction, in which the plurality of magnetism detection elements are arranged,
    the width of the movement restriction unit is greater than a width of the second magnetism detection element,
    the width of the movement restriction unit is smaller than a distance between the first magnetism detection element and the third magnetism detection element, and
    when viewed from the gear, the second magnetism detection element is inside the movement restriction unit.

2. The rotation sensor according to claim 1, wherein
    the plurality of magnetism detection elements include a first magnetism detection element and a third magnetism detection element, which are arranged in a direction perpendicular to the tooth trace of the gear, and
    the movement restriction unit is located on a side of the gear at a place between the first magnetism detection element and the third magnetism detection element.

3. The rotation sensor according to claim 1, wherein
    the movement restriction unit has a length along the tooth trace, and
    the length of the movement restriction unit is larger than a length of the second magnetism detection element.

4. The rotation sensor according to claim 3, wherein the length of the movement restriction unit is the same as a diameter of the case.

5. The rotation sensor according to claim 1, wherein
    the case accommodates the magnetism generation unit, and
    the magnetism generation unit is opposed to the gear across the plurality of magnetism detection elements.

6. The rotation sensor according to claim 1, wherein the gear is configured to direct at least one of teeth of the gear toward the magnetism generation unit in a direction in which the at least one of teeth projects from its root of the gear.

* * * * *